United States Patent
Mowry

(10) Patent No.: US 7,127,586 B2
(45) Date of Patent: Oct. 24, 2006

(54) PREFETCHING HINTS

(75) Inventor: Todd C. Mowry, Toronto (CA)

(73) Assignee: MIPS Technologies, Inc., Mountain View, CA (US)

( * ) Notice: Subject to any disclaimer, the term of this patent is extended or adjusted under 35 U.S.C. 154(b) by 51 days.

(21) Appl. No.: 09/804,677

(22) Filed: Mar. 12, 2001

(65) Prior Publication Data

US 2002/0010838 A1    Jan. 24, 2002

Related U.S. Application Data

(63) Continuation of application No. 08/982,244, filed on Dec. 1, 1997, now Pat. No. 6,240,488, which is a continuation of application No. 08/410,524, filed on Mar. 24, 1995, now Pat. No. 5,732,242.

(51) Int. Cl.
    *G06F 12/08* (2006.01)
(52) U.S. Cl. .................. 711/204; 711/213; 711/128; 711/137
(58) Field of Classification Search ............. 711/3, 711/128, 129, 133, 134, 137, 204, 209, 213; 712/207, 237
    See application file for complete search history.

(56) References Cited

U.S. PATENT DOCUMENTS

| | | | | |
|---|---|---|---|---|
| 3,898,624 A * | 8/1975 | Tobias | | 711/118 |
| 4,928,239 A | 5/1990 | Baum et al. | | 395/463 |
| 5,091,851 A | 2/1992 | Shelton et al. | | 395/455 |
| 5,396,604 A | 3/1995 | DeLano et al. | | 395/375 |
| 5,454,091 A | 9/1995 | Sites et al. | | 395/413 |
| 5,499,355 A | 3/1996 | Krishnamohan et al. | | 395/464 |
| 5,511,178 A | 4/1996 | Takeda et al. | | 395/452 |
| 5,530,958 A | 6/1996 | Agarwal et al. | | 395/403 |
| 5,548,739 A | 8/1996 | Yung | | 395/414 |
| 5,553,255 A | 9/1996 | Jain et al. | | 395/375 |
| 5,603,004 A | 2/1997 | Kurpanek et al. | | 395/445 |
| 5,732,242 A | 3/1998 | Mowry | | 395/463 |
| 5,737,750 A | 4/1998 | Kumar et al. | | 711/129 |
| 5,784,711 A * | 7/1998 | Chi | | 711/213 |
| 5,812,996 A | 9/1998 | Rubin et al. | | 707/2 |
| 5,822,757 A | 10/1998 | Chi | | 711/129 |
| 5,835,948 A | 11/1998 | Olarig et al. | | 711/128 |
| 5,933,860 A * | 8/1999 | Emer et al. | | 711/213 |
| 6,167,509 A * | 12/2000 | Sites et al. | | 712/237 |
| 6,594,728 B1 * | 7/2003 | Yeager | | 711/127 |

OTHER PUBLICATIONS

Cocke et al., "The evolution of RISC technology at IBM," *IBM J. Res. Develop*, (1990) 34:4-11.

Bakoglu et al., "The IBM RISC System/6000 processor: Hardware overview," *IBM J. Res. Develop*, (1990) 34:12-22.

Oehler et al., "IBM System/6000 processor architecture," *IBM J. Res. Develop*, (1990) 34:23-36.

Lam et al., "The Cache Performance and Optimizations of Blocked Algorithms," *Fourth Intern. Conf. on Architectural Support for Programming Languages and Operating Systems*, Palo Alto, CA, Apr. 9-11, 1991, pp. 1-12.

(Continued)

*Primary Examiner*—Gary Portka
(74) *Attorney, Agent, or Firm*—Townsend and Townsend and Crew LLP

(57) ABSTRACT

A processor capable of executing prefetching instructions containing hint fields is provided. The hint fields contain a first portion which enables the selection of a destination indicator for refill operations, and a second portion which identifies a destination.

12 Claims, 10 Drawing Sheets

OTHER PUBLICATIONS

Chi et al., "Compiler Driven Data Cache Prefetching for High Performance Computers," *IEEE*, New York, NY, vol. 1, pp. 274-278 (Aug. 1994).

Mowry, *Tolerating Latency Through Software-Controlled Data Prefetching*, Stanford University Dissertation (Mar. 1994).

Mowry, *Tolerating Latency Through Software-Controlled Data Prefetching*, (Slides from Thesis Defense of Todd C. Mowry, Jul. 15, 1993), 13 pages.

http://www.db.stanford.edu/TR/CSL-TR-94-628.html, Todd C. Mowry, (Jun. 1994) *Stanford University, Computer Systems Laboratory*, "Tolerating Latency Through Software-Controlled Data Prefetching".

Silicon Graphics Computer Systems, MIPS Technologies, Incorporated, 2011 N. Shoreline Blvd., Mountain View, CA 94039, "MIPS IV Instruction Set," (Jan. 1994) pp. A107, A108, B-82 and B-83.

\* cited by examiner

PREFETCHING HINTS

This application is a Continuation of U.S. application Ser. No. 08/982,244, filed Dec. 1, 1997, now U.S. Pat. No. 6,240,488, which is a Continuation of U.S. application Ser. No. 08/410,524, filed Mar. 24, 1995, now U.S. Pat. No. 5,732,242.

A prefirred embodiment of the present invention is incorporated by reference in a superscaler processor identified as "R10000," which was developed by Silicon Graphics, Inc., of Mountain View, Caif. Various aspects of the R10000 are described in commonly-owned patent applications having serial numbers: Ser. No. 08/324,124 ("Cache Memory"), Ser. No. 08/324,127 ("Redundant Mapping Tables"), Ser. No. 08/324,128 ("Memory Translation"), Ser. No. 08/324,129 ("Address Queue") and Ser. No. 08/404,625, filed Mar. 14, 1995, "Address Queue", which are hereby incorpated by refernce in their entirety for all purposes.

BACKGROUND OF THE INVENTION

This invention relates in general to computer processors capable of executing prefetch instructions and, in particular, to a processor capable of tailoring prefetch operations to accommodate certain types of data held in cache memories.

Modern computer processors are typically configured with a memory system consisting of multiple levels of memory having different speeds and sizes (main memory being the largest and slowest). The fastest memories are usually smaller in size since they cost more per bit than slower memories. To improve access time to main memory, one or more smaller, faster memories may be disposed between the main memory and the processor. Such memories, referred to as cache memories, serve as buffers between lower-speed main memory and the processor.

In some architectures, a hierarchy of caches may be disposed between the processor and main memory. See, J. Heinrich, *MIPS R4000 Microprocessor User's Manual*, p. 244 (PTR Prentice Hall 1993). Such a hierarchy may include, for example, a primary cache and secondary cache. Primary cache typically is the smallest cache memory having the fastest access time. Secondary cache is generally larger and slower than the primary cache but smaller and faster than main memory. Secondary cache serves as a backup to primary cache in the event of a primary cache miss.

To facilitate cache operation, a memory controller (part of the processor) is typically used to fetch instructions and/or data that are required by the processor and store them in the cache. When a controller fetches instructions or data, it first checks the cache. Control logic determines if the desired information is stored in the cache (i.e., cache hit). If a cache hit occurs, the processor simply retrieves the desired information from the cache.

However, if the desired data is not in the cache (i.e., cache miss), the controller accesses main memory (or the next level of cache memory) to load the accessed cache with the desired data. This loading operation is referred to as a "refill." Since cache size is limited, a refill operation usually forces some portion of data out of the cache to make room for the desired data. The displaced data may be written back to main memory to preserve its state before the desired data is refilled into the cache.

Processor performance is improved when desired data is found in a cache. A processor will operate at the speed of its fastest memory that contains desired data. When forced to access a slower memory (i.e., secondary cache or main memory) as a result of a miss, processor operations slow down thereby impeding performance. A cache-induced reduction in processor performance may be quantified as the function of a cache miss rate and average latency (i.e., delay) per miss to retrieve data from a slower memory; i.e., (miss rate)×(average latency per miss). Processor performance is improved by minimizing this product (i.e., reducing the miss rate and/or average latency per miss).

Cache miss rate may be reduced by controlling data flow in a cache (i.e., choosing what goes in and comes out of the cache). Ideally, a cache should contain useful (i.e., desired) data and discard useless data.

Latency may be reduced through the use of prefetching; i.e., the retrieval of data before it is required by a program. A prefetch instruction may initiate a cache refill but the processor need not wait for data to return from memory before proceeding with other instructions. Since prefetching accesses data before it is needed and in parallel with other processor operations, the latency associated with prefetched data is hidden.

Prefetching is possible when data patterns can be predicted (i.e., such as when processing matrices and arrays). Because prefetching is programmable, a compiler (or programmer or operating system) can judiciously use this instruction when warranted by the data (i.e., the compiler will consider the current pattern of memory references to determine whether it can predict future references).

In summary, the performance of a processor which uses a cache memory will be increased to the extent that data flow in the cache may be controlled to reduce the cache miss rate, and prefetching may be utilized to reduce the average latency per miss.

In some applications, certain data stored in a cache is reused extensively while other data is not. To minimize repeated refill operations, data that is reused extensively should not be replaced with data that is used infrequently. Accordingly, extensively reused data should be "retained" in the cache to the extent possible, while data that is not reused extensively should be allowed to pass or "stream" through the cache without restriction. (Such data is referred to herein as "retained data" and "streamed data," respectively.)

In addition to restricting the replacement of retained data, it is also desirable to hide the latency (i.e., delay) of accessing streamed data. (The latency of retained data is inherently hidden since this data is generally kept in the cache.)

The use of retained and streamed data, as defined above, arises in such cases as blocked matrix algorithms (where the "blocked" data should stay in the cache and not be replaced by "non-blocked" data; see, Lam et al., "The Cache Performance and Optimizations of Blocked Algorithms," *Fourth International Conference on Architectural Support for Programming Languages and Operating Systems* (ASPLOS IV), Palo Alto, Calif., Apr. 9–11, 1991), DSP algorithms (where the filter coefficients should stay in the cache and not be replaced by the stream of signal data), and operating system operations such a "bzero" (i.e., zero out a block of memory) and "bcopy" (copy a block of memory from one location to another).

One solution to restricting replacement of retained data is to "lock down" specific parts of the cache (i.e., bring the retained data into the cache and then lock it down so that it cannot be replaced by the streamed data). This "lock down" approach is undesirable, however, because it adds a special state to the cache (complicating operations such as context switching) and requires new instructions for the user (i.e., for specifying the portion of the cache to be locked and unlocked).

Another solution to restricting replacement of retained data that also hides the latency of accessing streamed data is to "prefetch" streamed data. In general, prefetching memory blocks into primary and secondary caches can increase performance by reducing delays required to refill caches. Such operation has no effect on the logical operation of a program and can significantly improve programs that have predictable memory accesses but have a high cache miss ratio. However, improper use of such prefetching operation can reduce performance by interfering with normal memory accesses.

Prefetching streamed data has been suggested through the use of an "uncached prefetch" instruction. This instruction segregates streamed data into a separate target buffer rather than storing such data in the normal cache memory (thereby preventing streamed data from displacing retained data held in the cache). However, uncached prefetches are undesirable because data must be buffered somewhere other than a cache or primary cache. Placing the prefetched data in a secondary cache but not the primary cache is undesirable because latency is not fully hidden. Further, placing the prefetched data in a special buffer off to the side of a primary data cache is also undesirable since it complicates multiprocessor snooping and, in fact, creates another primary cache.

Accordingly, there is a need to control the destination of retained and streamed data flowing into a cache system to ensure that one type of data does not displace the other type of data during refill operations, and a need to minimize the latency associated with accessing such data.

SUMMARY OF THE INVENTION

The present invention provides for an apparatus and method that allows the use of indicators (i.e., prefetching "hint" bits) within an instruction format to control which way in an n-way set-associative cache prefetched data should be placed.

In one embodiment, the present invention provides for a processor that includes a decoder for decoding a prefetch instruction; an address queue for holding a decoded prefetched instruction, wherein the prefetched instruction includes a hint field and address information; a first n-way set-associative cache, coupled to the address queue, containing a first-cache line that is addressed using the address information; a first comparator means, coupled to the first cache, for indicating a first-cache miss when the first-cache line is addressed and does not contain desired data; and a first selection means, coupled to the first cache, for choosing a destination indicator for refilling the first cache line with the desired data based on a first portion of the hint field.

A better understanding of the nature and advantages of the present invention may be had with reference to the detailed description and the drawings below.

DESCRIPTION OF THE PREFERRED EMBODIMENT

Contents

Figure 1:
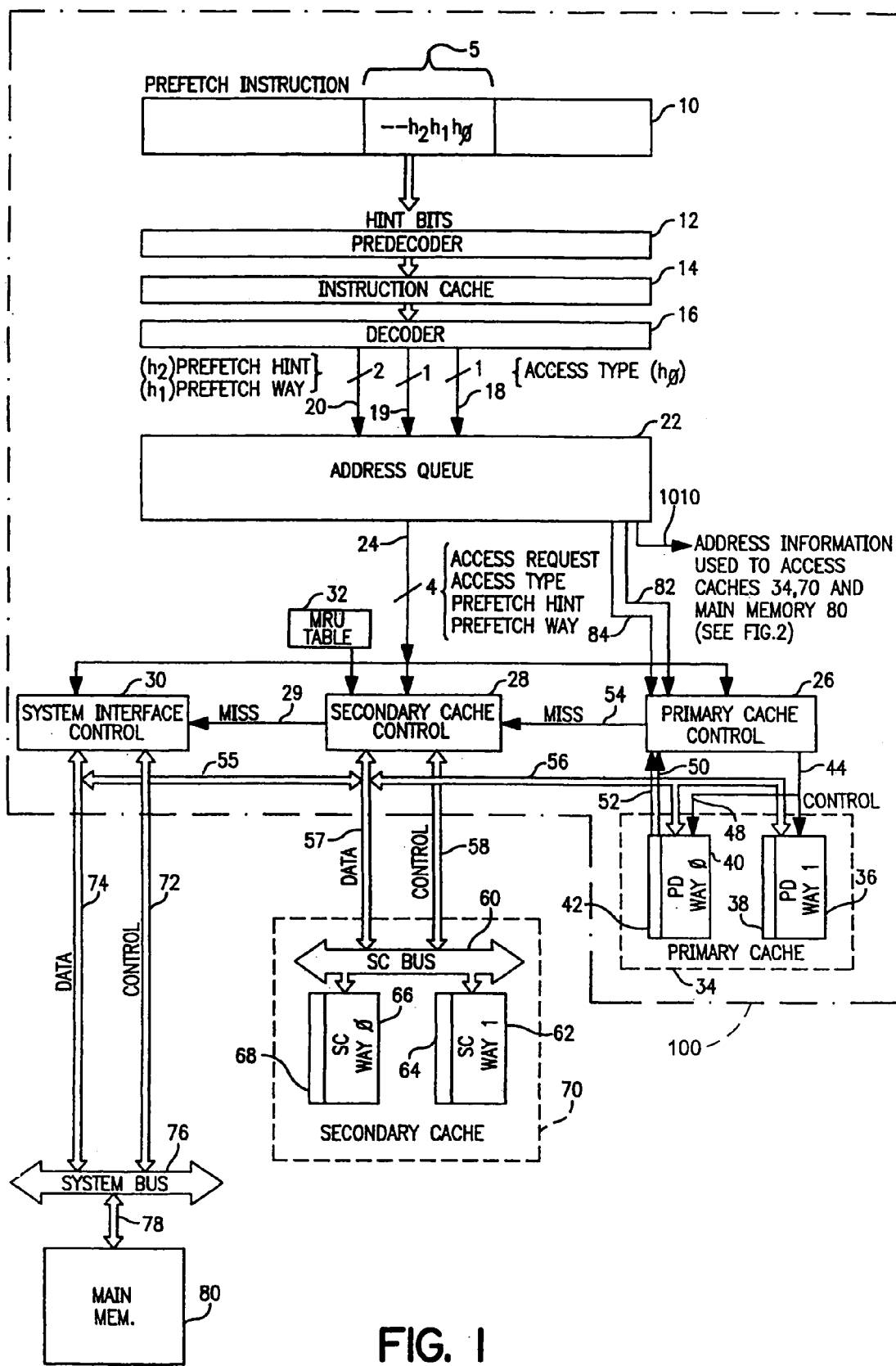
FIG. 1 is a block level diagram of a processor system employing prefetching hints in accordance with an embodiment of the invention.

I. System
II. Predecode and Decode
III. Primary Cache Control
IV. Secondary Cache Control I. System FIG. 1 provides a block-level diagram of processor 100 employing prefetching hints in accordance with an embodiment of the invention. The architecture of processor 100 as shown in FIG. 1 is implemented in the R10000 Super-scalar Microprocessor developed by Silicon Graphics, Inc., of Mountain View, Calif. The processor is further described in J. Heinrich, *MIPS R10000 Microprocessor User's Manual*, MIPS Technologies, Inc., (1994), which is hereby incorporated by reference in its entirety for all purposes.

A. Architecture

1. System of FIG. 1

Referring to FIG. 1, processor 100 includes predecoder 12, whose inputs are coupled to secondary cache 70 and main memory 80 (connections not shown). Predecoder 12 receives instructions from these memory units, including prefetch instruction 10 which contains prefetching hint bits 5 (i.e., h2, h1 and h0).

The outputs of predecoder 12 are coupled to instruction cache 14, which receives "predecoded" instructions. Instruction cache 14 is further coupled to decoder 16, which receives instructions issued from cache 14. Decoder 16 is coupled to address queue 22, which receives and temporarily holds decoded memory-access instructions (e.g., load, store and prefetch instructions) until they can be executed.

Address queue 22 is coupled to primary cache control 26, secondary cache control 28 and system interface control 30 via bus 24, as shown in FIG. 1. Address queue 22 is also coupled to control 26 through lines 84 and 82, which convey status information of an addressed block. Primary cache control 26, which controls access to primary cache 34, is coupled to secondary cache control 28 through primary miss line 54, and is coupled to primary cache 34 via control lines 44, 46, 48, 50 and 52.

Secondary cache control 28, which controls access to secondary cache 70, is coupled to system interface control 30 through secondary miss line 29, and to secondary cache 70 through control bus 58 and data bus 57.

System interface control 30, which controls access to main memory 80, is coupled to the main memory through data bus 74 and control bus 72. Data bus 74 is coupled to data bus 57 through bus 55. Further, data bus 74 and control bus 72 are coupled to system bus 76 which is, in turn, coupled to input/output bus 78. This latter bus is coupled to main memory 80.

Although not shown in FIG. 1, registers for temporarily holding data or control information are periodically disposed within the buses of the system shown in this figure.

Primary cache 34 is two-way set-associative (i.e., two cache blocks are assigned to each set). Way 0 of cache 34 includes data array 40 and tag array 42. Similarly, way 1 includes data array 36 and tag array 38. This cache is indexed with a virtual address and tagged with a physical address. A more detailed description of primary cache 34 may be found in co-pending U.S. patent application Ser. No. 08/324,124 which, as noted above, is incorporated by reference in its entirety for all purposes.

Secondary cache 70 is also two-way set-associative. Way 0 of cache 70 includes data array 66 and tag array 68. Similarly, way 1 of cache 70 includes data array 62 and tag array 64. This cache is indexed with a physical address and tagged with a physical address.

2. Addressing Architecture

Figure 2:
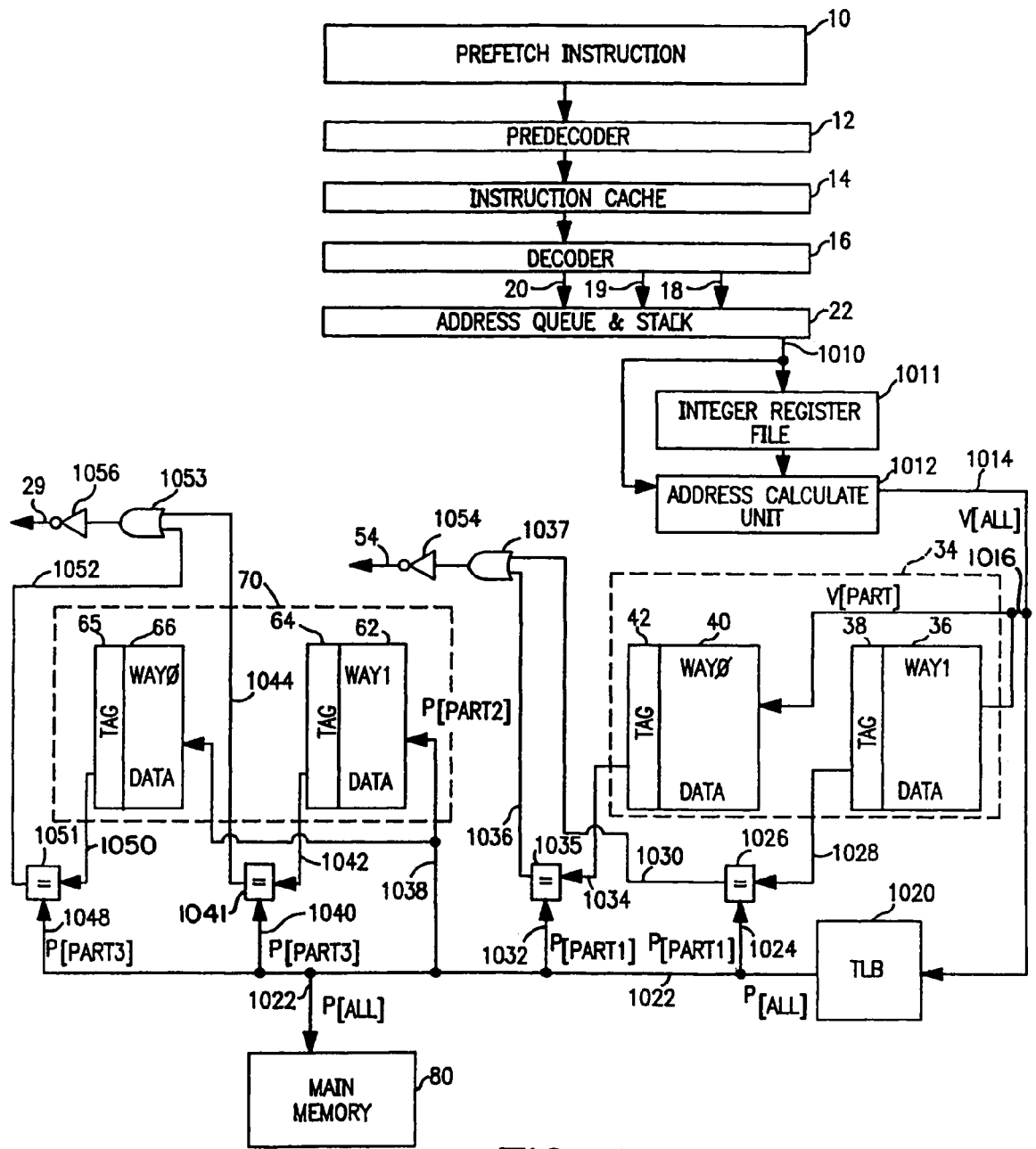
FIG. 2 is a block diagram of the addressing architecture of the system of FIG. 1.

The addressing architecture for the system of FIG. 1 is illustrated in FIG. 2. Address information held in queue 22 (e.g., offset value and/or register numbers) is forwarded to an integer register file 1011 and address calculate unit 1012, which generates a virtual address (i.e., V; a complete virtual address) on line 1014. This virtual address is converted to a physical address (i.e., P; a complete physical address) through translation lookaside buffer (TLB) 1020. A more detailed description of this architecture is provided in U.S. patent application Ser. Nos. 08/324,128, 08/324,129, and 08/404,625, which, as noted above, are incorporated herein by reference in their entirety for all purposes.

Referring to FIG. 2, a portion of the address on line 1014 (i.e., V[part]) is applied as an index to primary cache 34 on line 1016. V[part] identifies a set in primary cache 34 containing two cache blocks (i.e., one in way 0 and another in way 1). Each cache block contains a data portion (held in arrays 40 and 36) and a tag portion (held in arrays 42 and 38). Within the tag portions is a physical tag 909 (way 0) and 911 (way 1) (FIG. 9) which uniquely identifies each block within a set.

The physical tag of each cache block identified by V[part] is output to comparators 1026 and 1035, which are coupled to tag arrays 38 and 42, respectively. A portion of the physical address generated by TLB 1020 (i.e., P[part1]) is also input to these comparators, as shown in FIG. 2. If the physical tag from either array matches P[part1], the corresponding signal line 1030 or 1036 goes high (i.e., logic 1). Alternatively, if neither comparator identifies a match, lines 1030 and 1036 remain low (i.e., logic 0). These lines are ORed together at gate 1037 and inverted by inverter 1054 thereby creating a signal on primary miss line 54 (i.e., high=primary-cache "miss," low=primary cache "hit").

As shown in FIG. 2, similar architecture is used to address secondary cache 70. In this case, however, a portion of the physical address P[all] on line 1022 is used to index the cache on line 1038 (i.e., P[part2]) and thereby identify two cache blocks held in a single set (i.e., one block in way 0 and another in way 1). Another portion of P[all] is used to check a physical tag associated with each addressed block (i.e., P[part3]) through comparators 1051 (way 0) and 1041 (way 1). The output of these comparators (where a high signal represents a hit and a low signal represents a miss) are ORed together by gate 1053 and inverted by inverter 1056, thereby creating a signal for secondary miss line 29 (i.e., high=secondary-cache "miss").

The portions of virtual address V[all] and physical address P[all] used to index and tag-check cache entries is application specific. This two-level (i.e., primary and secondary cache), two-way, set-associative cache structure is well known to those having ordinary skill in the art.

B. Operation of System

1. Overall Operation

The system of FIG. 1 enables the use of prefetching hints in accordance with an embodiment of the invention. More specifically, prefetch instruction 10 (retrieved from main memory or secondary cache) containing prefetching hint bits 5 is partially decoded in predecoder 12 as it is written into instruction cache 14 during an instruction cache refill operation. Predecoding rearranges fields within the instruction to facilitate later decoding. In addition, the high three bits of the opcode of an instruction are modified during predecode to specify a register destination (if any) of the instruction. A prefetch instruction issuing from instruction cache 14 is decoded in decoder 16 and subsequently loaded into address queue 22.

Prefetching hint bits 5 contained in prefetch instruction 10 are processed through predecoding and decoding operations and output on lines 20 (indicating a prefetch destination (h1) and enabling the use of this indicator (h2)) and 18 (indicating whether a prefetch request is for a load or a store (h0)). (These prefetching hint bits are discussed in greater detail below.) An additional bit resulting from the decoding operation and shown in FIG. 1 is an "access request" bit on line 19 (indicating a memory access request such as prefetch, load or store). These bits are temporarily held in address queue 22 until the prefetch instruction is issued from the queue for purposes of execution. At which point, all four bits are forwarded to primary cache control 26 and secondary cache control 28 over line 24.

Other bits held in address queue 22 include instruction operation codes and address information (e.g., offset values and register numbers). As described above in connection with FIG. 2, address-related bits are output on line 1010 to an integer register file 1011 and an address calculate unit 1012 to generate a virtual address. This address is subsequently forwarded to TLB 1020 to generate a physical address. The use of virtual and physical addresses in connection with primary cache 34 and secondary cache 70 is described above in connection with FIG. 2.

Returning to FIG. 1, when prefetch instruction 10 is issued from queue 22, processor 100 calculates an address associated with this instruction (in this embodiment, virtual and physical addresses are calculated as shown in FIG. 2) and applies this address to primary cache 34, secondary cache 70 and main memory 80.

Should primary cache 34 contain the desired data, a primary-cache "hit" occurs (as described above) and the prefetch instruction causes no action. In short, instruction 10 is considered "done" by processor 100 and removed from the system. No further processing need be performed.

Conversely, if primary cache 34 does not contain the data, a primary-cache "miss" occurs (as described above) and primary cache control 26 notifies secondary cache control 28 through miss line 54 (i.e., logic 1). In response, secondary cache 70 is addressed for the missing data. If the desired data is found in the secondary cache (i.e., a secondary-cache hit; see above), this data is used to "refill" primary cache 34 over data busses 56 and 57. Significantly, in certain circumstances, the prefetching hint bits provided on line 20 may be used to identify which way of primary cache 34 should be refilled.

If, however, secondary cache 70 does not contain the desired data, a secondary-cache "miss" occurs (see above) and secondary cache control 28 notifies system interface control 30 through miss line 29 (i.e., logic 1). In response, main memory 80 is addressed for the missing data. When the data is found, it is used to "refill" secondary cache 70 and primary cache 34 over data buses 74, 55, 57 and 56. Again, in certain circumstances, the prefetching hint bits provided on line 20 may be used to identify which way of primary cache 34 and secondary cache 70 should be refilled.

More specifically, the hint bits provided on line 20 (and ultimately conveyed to secondary cache control 28 and primary cache control 26 as described herein) may be used to direct the flow of data into way 0 or way 1 of either cache and thereby prevent streamed data from displacing retained data during refill operations.

2. Refill Operation

Figure 3:
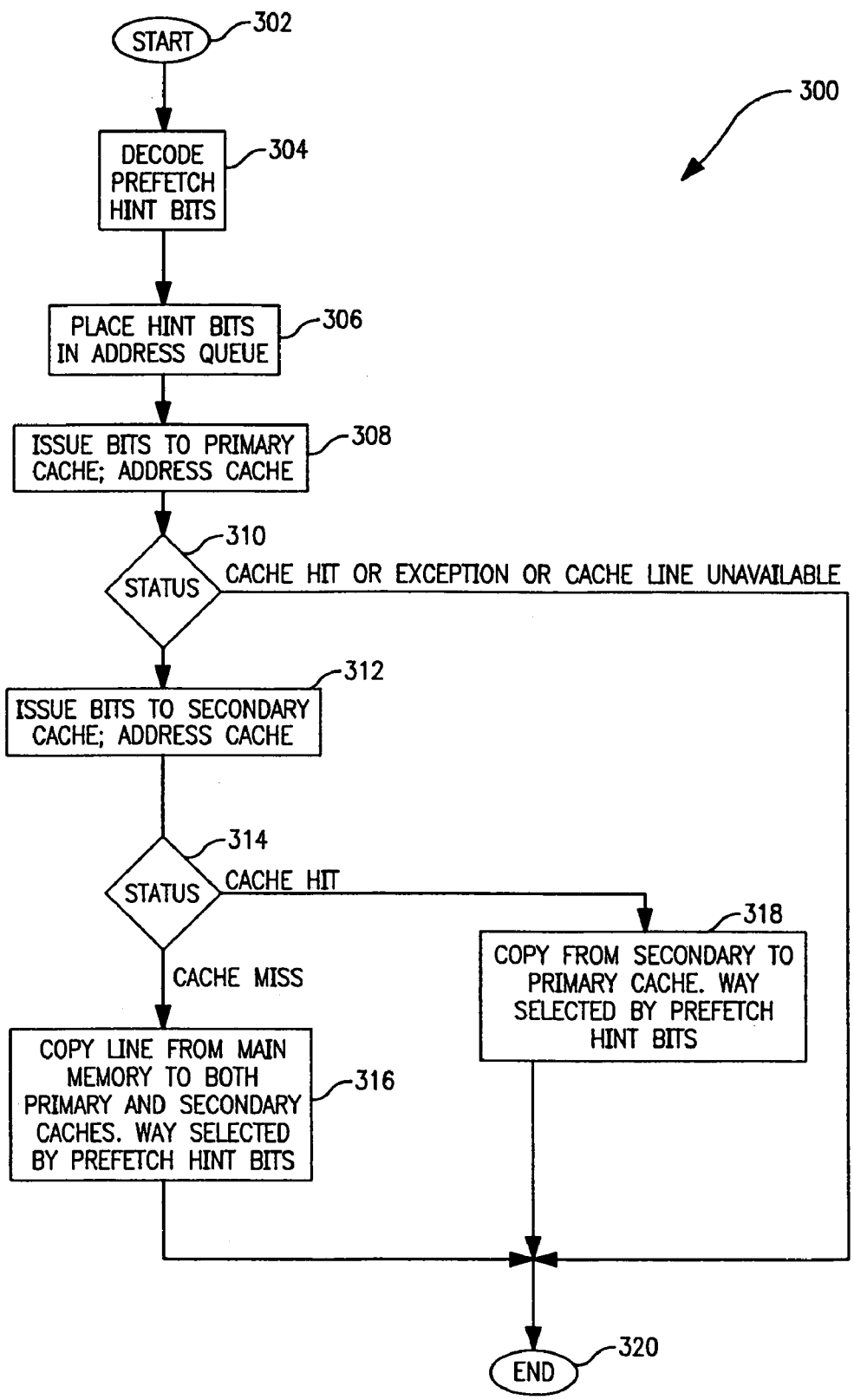
FIG. 3 is a flow chart illustrating a refill operation using prefetching hints.

The use of prefetching hint bits in accordance with the system of FIG. 1 to carry out refill operations is illustrated in the flow chart 300 of FIG. 3. At block 302, prefetch instruction 10 has already been predecoded and loaded into instruction cache 14. At block 304, hint bits held in prefetch instruction 10 are decoded in decoder 16. These bits are then forwarded to address queue 22 in accordance with block 306, and thereafter issued to primary cache control 26 pursuant to block 308.

At about the same time, a virtual memory address calculated from information held within prefetch instruction 10 is forwarded to primary cache 34 to determine whether there is a hit or a miss. In the event of a cache hit, no prefetching operation is required and the prefetch operation is terminated without effect, as indicated by blocks 310 and 320.

Similarly, if an addressed cache line (i.e., cache location holding a cache block) is "unavailable" (discussed below), or there is an exception resulting from a prefetch instruction, the prefetch operation is terminated without effect, as indicated by blocks 310 and 320. (The architecture of processor 100 may ignore prefetching hint bits—or the prefetch instructions entirely—since prefetch instructions do not effect the results of a program. Accordingly, if any problem is encountered, these instructions are simply aborted without generating any exceptions.)

On the other hand, if there is a primary-cache miss on an available cache line, a-miss signal is sent to secondary cache control 28 to enable secondary cache access in accordance with block 312 (using the prefetching hint bits on line 24 and a physical address generated by TLB 1020 (FIG. 1)). If the secondary cache hits, the addressed line is copied from secondary cache 70 to primary cache 34 (i.e., cache 34 is refilled with data conveyed over data buses 57 and 56 (FIG. 1)) in the way selected by the hint bits held in prefetch instruction 10, pursuant to blocks 314 and 318 of FIG. 3. During this time, the refill status is recorded in the state field (i.e., 910 or 906 of FIG. 9) of the cache tag associated with the selected way.

Conversely, if there is a secondary-cache miss, the subject line is copied from main memory 80 to secondary cache 70 and primary cache 34 (i.e., caches 34 and 70 are refilled with data conveyed over buses 74, 55, 57 and 56 (FIG. 1)) in the way selected by the hint bits held in prefetch instruction 10, in accordance with blocks 314 and 316. System interface control 30 includes conventional control logic (not shown) used to retrieve data from main memory (i.e., "main memory access logic"). After the desired information has been refilled into the appropriate cache(s), prefetch operation is terminated in accordance with block 320.

3. Availability

Figure 9:
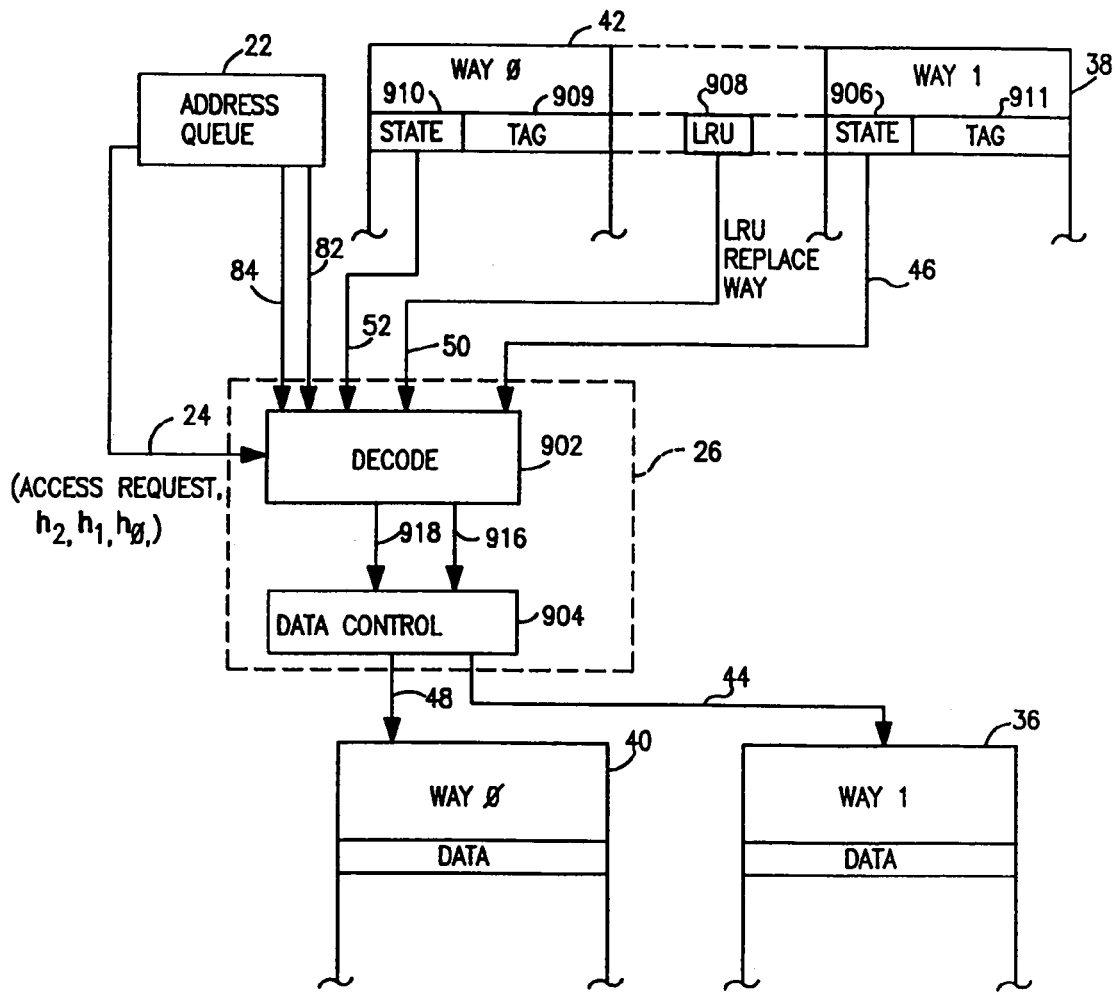
FIGS. 9, 10 and 11 illustrate components of the primary cache control unit of FIG. 1.

The availability of a primary cache line is indicated by state bits held in address queue 22 and tag arrays 38 and 42 of primary cache 34. Referring to FIG. 9, tag arrays 38 and 42 hold state fields 906 and 910, respectively. Further, address queue 22 holds "lock" and "use" bits indicating that a particular block is reserved by another instruction held in the queue. These values are forwarded to primary cache control 26 over lines 84 and 82, respectively, as shown in FIG. 1. (A discussion of lock and use bits is provided in copending U.S. application Ser. Nos. 08/324,129 and 08/404,625, which, as noted above, are incorporated herein by reference in their entirety for all purposes.) The values held by these state bits are used to determine whether a refill operation may proceed (discussed below).

A number of conditions may make a primary cache block unavailable for refill. For example, if the addressed block is already in a refill state (indicated by state fields 906 or 910), it is unavailable for additional refill activities. Further, if another entry in address queue 22 has flagged the addressed block as "locked" or "used" (i.e., the block is needed for another memory-access operation), the block (i.e., way) is unavailable for refill.

Figure 4:
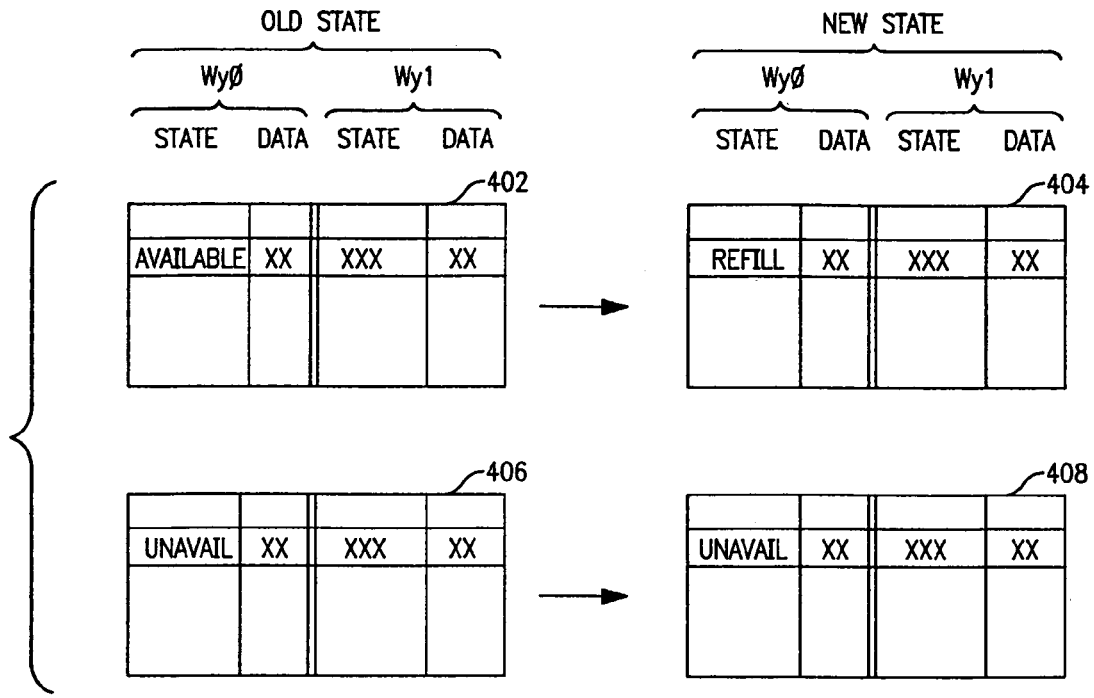
FIGS. 4 and 5 illustrate the effect of cache block availability on prefetching operations.
Figure 5:
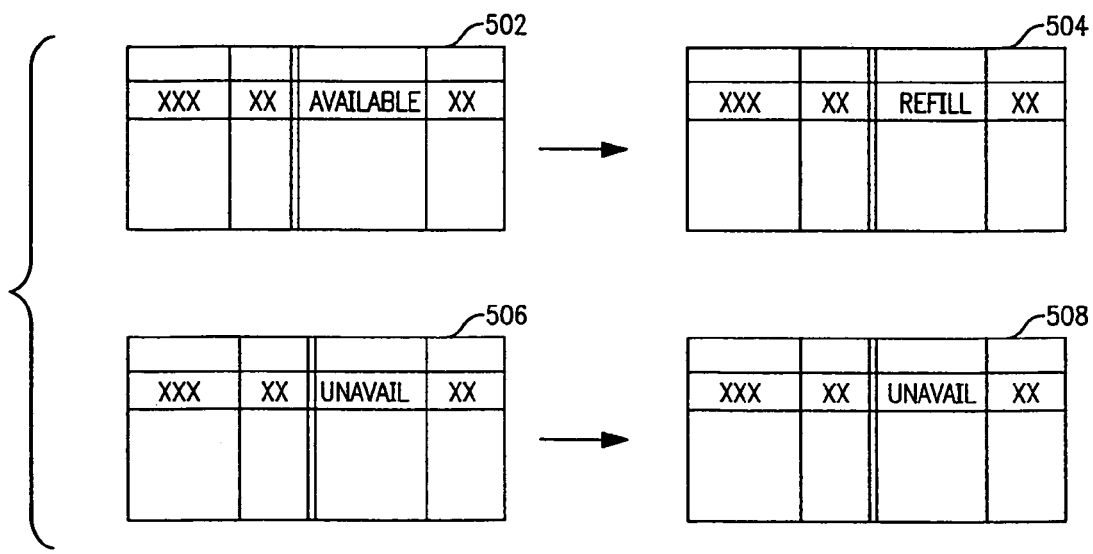

FIGS. 4 and 5 graphically illustrate the effect of block availability. In FIG. 4, prefetching hint bits direct way 0 to be refilled. Should this way be available for a selected line (402), refill will proceed (404). Conversely, should way 0 of the selected line be unavailable (406), the prefetching operation is terminated without effect and the subject block remains unavailable (408). FIG. 5 illustrates the same effect when prefetching hint bits direct way 1 to be refilled.

C. Prefetch Instruction Format

Figure 6:
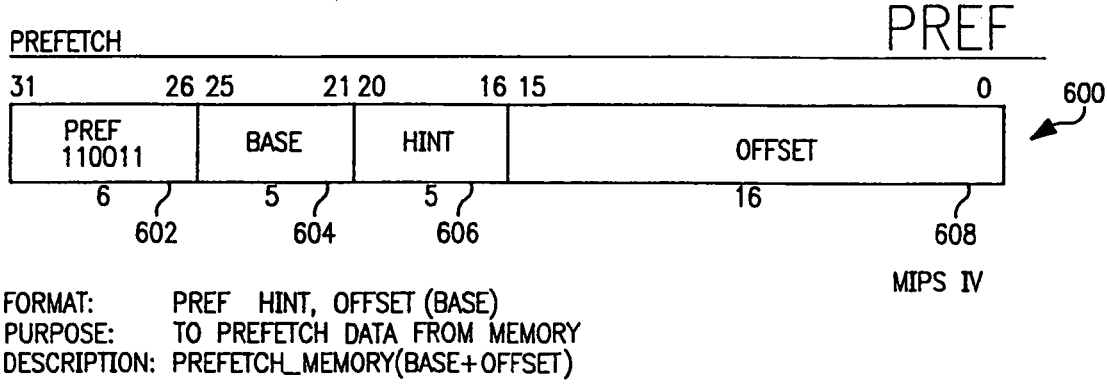
FIGS. 6 and 7 illustrate formats of two prefetch instructions used by the system of FIG. 1.
Figure 7:
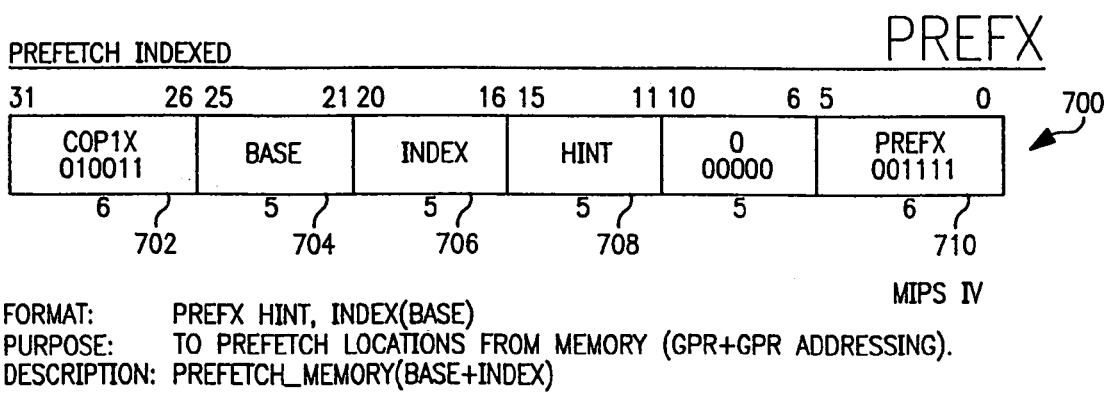

The system of FIG. 1 uses two formats of prefetch instructions; PREF (FIG. 6) and PREFX (FIG. 7). PREF 600 adds a 16-bit signed offset 608 to the contents of a register identified by base field 604 to form a virtual address. Hint field 606 is a 5-bit field holding prefetching hint bits that operate as described herein. These bits may be set by a programmer, compiler or operating system. The PREF operation code is identified in field 602.

PREFX 700 adds the contents of a register identified by base field 704 to the contents of a second register identified by index field 706 to form a virtual address. Hint field 708 is a 5-bit field holding prefetching hint bits that operate as described herein. These bits may be set by the programmer, compiler or operating system. The PREFX operation code is identified in field 710. Both instruction formats are further described in C. Price, *MIPS R10000—Mips IV ISA Manual*, MIPS Technologies, Inc. (1994), which is hereby incorporated by reference in its entirety for all purposes.

D. Prefetching Hint Bits

As discussed generally above, prefetching hint bits contained in a prefetch instruction indicate what prefetching operation is expected (e.g., load/store) and possibly the destination (i.e., cache way) for associated data. Although the prefetch instructions in FIGS. 6 and 7 contain 5-bit hint fields, the system of FIG. 1 uses only three of these five bits. The specific use of each bit is illustrated in Tables 1 and 2, discussed below.

TABLE 1

Bit-Specific Action for Bits Held in Hint Field

| Hint Bits h4h3h2h1h0 | Definition | Description of Action (Applies to Primary and/or Secondary Caches) |
| --- | --- | --- |
| x x x x 0 | Prefetch Shared (load) | Cache Hit: no action. Cache Miss: refill cache with a "shared" (i.e., load) memory read. |
| x x x x 1 | Prefetch Exclusive (store) | Cache Hit on writable block: no action. Cache Hit on non-writable block: |

TABLE 1-continued

Bit-Specific Action for Bits Held in Hint Field

| Hint Bits h4h3h2h1h0 | Definition | Description of Action (Applies to Primary and/or Secondary Caches) |
|---|---|---|
| | | request upgrade to writable. Cache Miss: refill cache with an "exclusive" (i.e., store) memory read. |
| x x 0 0 x | Prefetch Normal | Refill either way of the cache, using normal "Least Recently Used" (LRU) method. |
| x x 0 1 x | (undefined) | — |
| x x 1 0 x | Prefetch Way 0 | Refill only way 0 of the cache. |
| x x 1 1 x | Prefetch Way 1 | Refill only way 1 of the cache. |

As shown in Table 1, the system of FIG. 1 uses only the low three bits of the hint field. If bit 0 (i.e., h0) is set, the instruction will request an exclusive copy of the cache block (i.e., a store operation), which can be written. Otherwise, if h0 is clear, the cache will request a shared copy of the cache block (i.e., a load operation).

Further, bit 2 (i.e., h2) enables the hint field to direct data to way 0 or way 1 of the cache in accordance with bit 1 (i.e., h1). Specifically, if h2 is set, h1 selects which way is refilled if there is a cache miss. If h2 is clear, prefetch operation proceeds normally, selecting a cache way in accordance with the default way-selection method of the processor (in this case, using a "least recently used" (LRU) method). The corresponding data use and operation for each combination of bits h2, h1 and h0 is illustrated in Table 2 below.

TABLE 2

Data Use and Operation for Select Hint Bit Combinations

| Hint Bits h2h1h0 | Prefetch Operation | Data use and operation |
|---|---|---|
| 0 0 0 | Load using LRU way | Data is expected to be loaded (not modified). Fetch data as if for a load. |
| 0 0 1 | Store using LRU way | Data is expected to be stored or modified. Fetch data as if for a store. |
| 0 1 0 | Undefined | |
| 0 1 1 | | |
| 1 0 0 | Load streamed way 0 | Data is expected to be loaded (not modified) but not reused extensively; it will "stream" through cache. Fetch data as if for a load and place it in the cache so that it will not displace data prefetched as "retained". |
| 1 0 1 | Store streamed way 0 | Data is expected to be stored or modified but not reused extensively; it will "stream" through cache. Fetch data as if for a store and place it in the cache so that it will not displace data prefetched as "retained". |
| 1 1 0 | Load retained way 1 | Data is expected to be loaded (not modified) and reused extensively; it should be "retained" in the cache. Fetch data as if for a load and place it in the cache so that it will not be displaced by data prefetched as "streamed". |

TABLE 2-continued

Data Use and Operation for Select Hint Bit Combinations

| Hint Bits h2h1h0 | Prefetch Operation | Data use and operation |
|---|---|---|
| 1 1 1 | Store retained way 1 | Data is expected to be stored or modified and reused extensively; it should be "retained" in the cache. Fetch data as if for a store and place it in the cache so that it will not be displaced by data prefetched as "streamed". |

II. Predecode and Decode

Figure 8:
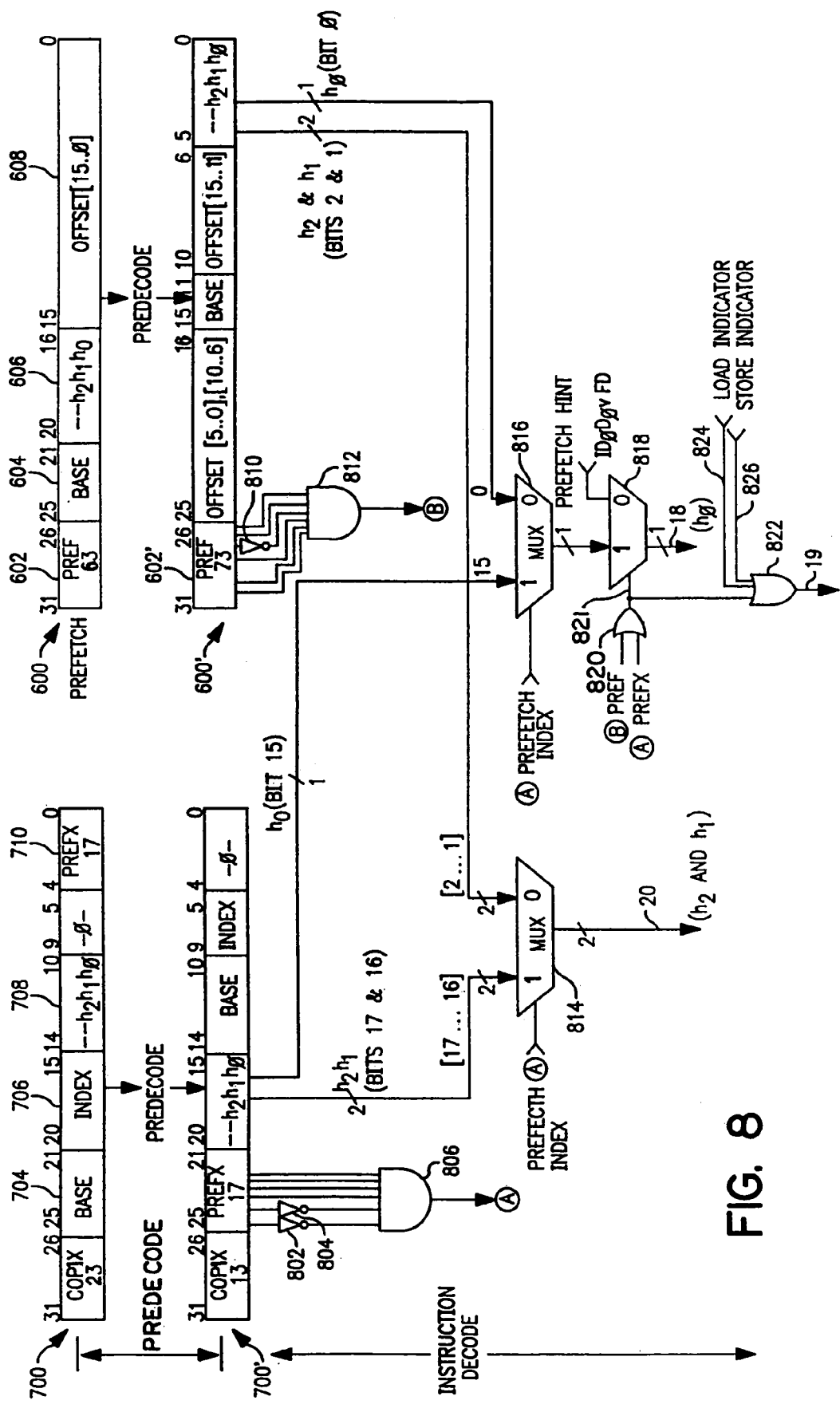
FIG. 8 illustrates predecode and decode operations as they relate to the instructions of FIGS. 6 and 7.

FIG. 8 illustrates predecode and decode operations as they relate to prefetch instructions PREF 600 and PREFX 700. As illustrated in FIG. 8, predecoding of both instructions essentially results in the rearrangement of fields within each instruction format; i.e., PREF 600 becomes 600' and PREFX 700 becomes 700'. As noted above, predecoding facilitates later decoding.

The function code of instruction 700' is decoded through inverters 802, 804 and AND gate 806, as shown in FIG. 8. The resulting signal "A" is high (i.e., logic 1) when the function code of the instruction being decoded is the PREFX code of field 710 (see FIG. 7). This signal is forwarded to the control inputs of MUXs 814, 816 and to an input of OR gate 820.

MUX 814 selects bits h2 and h1 of instruction 700' when signal A is high, and bits h2 and hi of instruction 600' when signal A is low. The output of MUX 814 is coupled to line 20, which feeds bits h2,h1 to address queue 22 (FIG. 1). Similarly, MUX 816 selects bit h0 of instruction 700' when signal A is high, and bit h0 of instruction 600' when signal A is low. The output of MUX 816 is fed into MUX 818, which is described below.

The predecoded operation code 602' of instruction 600' is decoded through inverter 810 and AND gate 812, as shown in FIG. 8. The resulting signal "B" is high (i.e., logic 1) when the operation code of the instruction being decoded is the predecoded PREF opcode of field 602' (see FIG. 8). This signal is forwarded to an input of OR gate 820.

Output 821 of OR gate 820 is coupled to the select input of MUX 818. If the instruction being decoded is either PREF or PREFX, output 821 is high and the output of MUX 816 (i.e., h0 of PREF or PREFX) is selected by MUX 818. In such case, the output of MUX 818 is coupled to line 18, which will feed selected bit h0 to address queue 22 (FIG. 1). Conversely, if output 821 is low, line IDODOvFd is selected, which represents a signal associated with floating point operations and unrelated to prefetching hints.

Output 821 is also coupled to the input of OR gate 822. If the instruction being decoded is a prefetch, output 821 is high and this high value passes through OR gate 822 to line 19. As noted above, line 19 represents an "access request bit"—indicating a memory access request such as prefetch, load or store. Alternatively, load indicator on line 824 and store indicator on line 826 are high (like output 821) when the instruction being decoded is a load or store, respectively. Accordingly, load and store instructions also generate a high signal on line 19 ("access request").

III. Primary Cache Control

Figure 10:
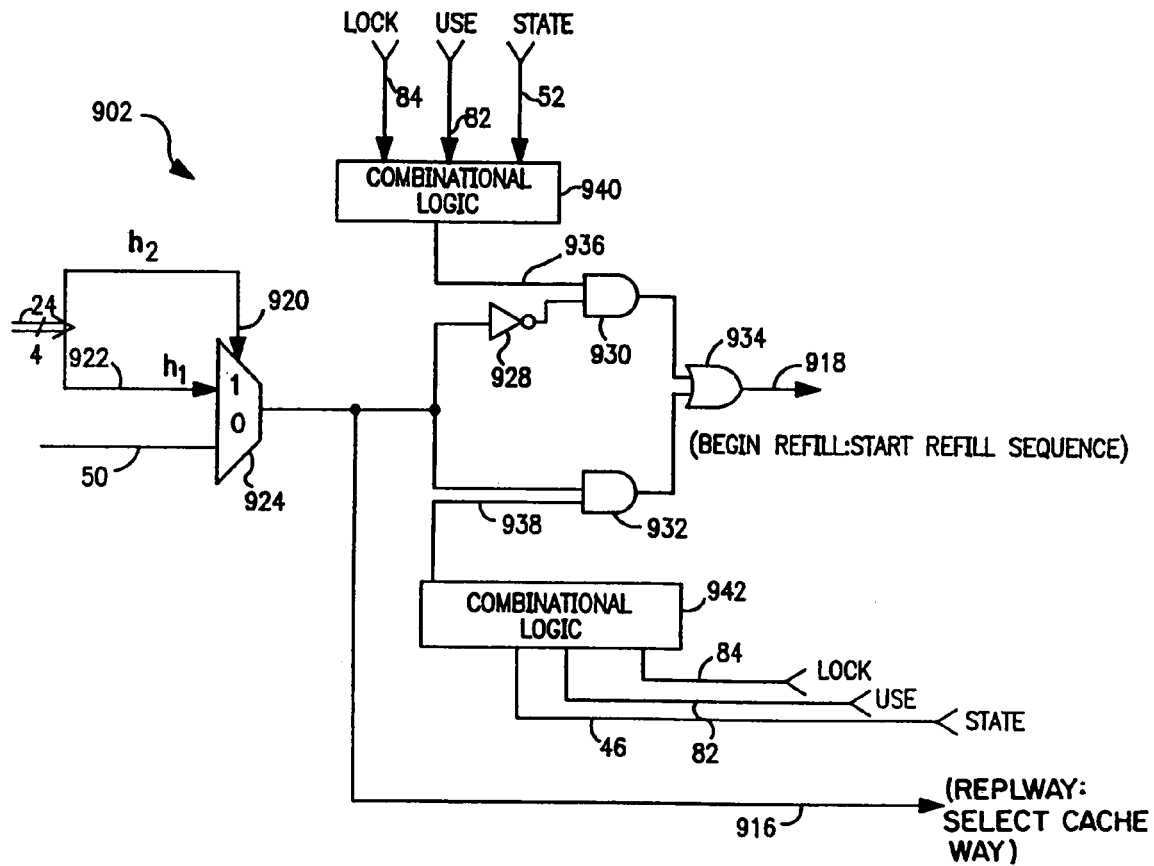
Figure 11:
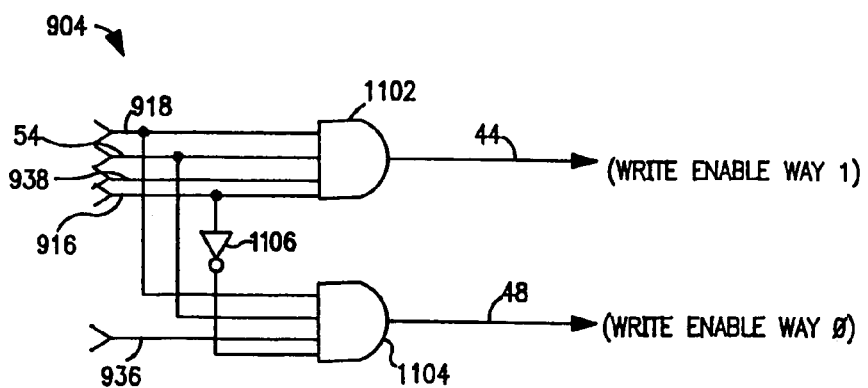

FIGS. 9, 10 and 11 illustrate components of primary cache control 26 which facilitate way selection (using prefetching hint bits) for a primary cache refill operation. Referring to FIG. 9, control 26 includes a decode circuit 902 and data control circuit 904. Block diagrams of these circuits are provided in FIGS. 10 and 11, respectively.

Circuit 902 receives bits h2, h1, h0 and "access request" on line 24, cache information from tag arrays 42 and 38, and state information from queue 22. In particular, tag array 42 provides state information of an addressed cache block (i.e., way 0) on line 52 and an LRU value for the associated set on line 50. Similarly, tag array 38 provides state information of an addressed cache block (i.e., way 1) on line 46. Address queue 22 provides status bits (i.e., lock and use) associated with an addressed block on lines 84 and 82, respectively.

Referring to FIG. 10, bit h2 from line 24 is applied to the select input of MUX 924. This MUX selects between bit hi on line 922 and the LRU bit on line 50. If h2 is high, prefetching hints are active (see Tables 1 and 2) and bit h1 is selected. Alternatively, if h2 is low, prefetching hints are inactive and way selection is determined through an LRU bit held in the tag array for the addressed set.

State information for way 0 is conveyed on line 52 to combinatorial logic 940. Similarly, status bits from address queue 22 (i.e., lock and use bits) corresponding to the addressed block in way 0 are forwarded to logic 940. If the addressed block is locked, used or undergoing refill, lines 84, 82 or 52, respectively, will indicate this status with a high logic state (i.e., logic 1). In such instance, logic 940 will force line 936 low (i.e., logic 0) indicating way 0 is unavailable. Alternatively, if way 0 is available, line 936 will be high.

Similarly, state information for way 1 is conveyed on line 46 to combinational logic 942. Again, status bits from queue 22 corresponding to the addressed block in way 1 are forwarded to logic 942. If the addressed block is locked, used or undergoing refill, lines 84, 82 or 46, respectively, will indicate this status with a high logic state (i.e., logic 1). In such instance, logic 942 will force line 938 low indicating way 1 is unavailable. Alternatively, if way 1 is available, line 938 will be high.

As shown in FIG. 10, the output of MUX 924 is inverted by inverter 928 and ANDed with line 936 in AND gate 930. MUX 924 output is also ANDed with line 938 in AND gate 932. Should either gate 930 or 932 output a high signal, this signal will pass through OR gate 934 and result in a high state on line 918. A high signal on 918 enables a refill sequence to begin.

As shown in FIG. 11, the signals on lines 918, 936, 938 (FIG. 10), and 54 (FIGS. 1 and 2) are combined in AND gates 1102 and 1104. The signal on line 916 is input directly into AND gate 1102, but is inverted by inverter 1106 before being input into AND gate 1104. The outputs of 1102 and 1104 are forwarded to primary cache 34, conveying a write enable signal to way 1 (line 44) and way 0 (line 48), respectively, thereby enabling a refill operation to a particular way. As described above, data used for primary cache refill operations may come from secondary cache 70 or main memory 80.

Processor 100 defaults to an LRU method for identifying cache ways in a prefetch operation when prefetching hints h1 and h2 are inactive (i.e., h2 is low) and both ways are valid. If either way is "invalid" (i.e., empty), a new block can be loaded without invalidating any previous block. Specifically, if block 0 is invalid, it is replaced. Otherwise, if block 1 is invalid, it is replaced.

For any particular set in primary cache 34, LRU bit 908 (FIG. 9) is set according to Table 3 for purposes of selecting the next block (i.e., way) in a cache refill.

TABLE 3

| | | LRU States | |
|---|---|---|---|
| Old LRU | Cache Tag Check | New LRU | Description |
| x | Refill Way 0 | 1 | If either way of the cache is refilled, the LRU bit is set equal to the opposite way. |
| x | Refill Way 1 | 0 | |
| x | Hit Way 0 | 1 | If the processor gets a cache hit on either way of the cache, the LRU bit is set equal to the opposite way, because it is now "least recently used." |
| x | Hit Way 1 | 0 | |
| 0 | Miss or other | 0 | If the processor gets a cache miss, or on other cycles, the LRU bit is not changed. |
| 1 | Miss or other | 1 | |

More specifically, LRU bit 908 indicates which block within each set of cache 34 was least recently used. When it is necessary to replace one of two valid blocks, an LRU block is selected because it is statistically less likely to be used next. Under prefetch conditions, this bit is used when three requirements are satisfied: (1) processor 100 initiates a cache prefetch refill, (2) prefetching hint bits h2 and h1 are inactive, and (3) both blocks in the selected cache set are valid.

As shown in FIG. 9, tag arrays 38 and 42 contain one LRU bit 908 per set of the cache (i.e., per two cache blocks). While LRU bit 908 is held by the same hardware that makes up tag arrays 38 and 42, it is not considered to be exclusively held by either array and therefore is shown connected to both arrays in FIG. 9 with dotted lines.

Whenever processor 100 gets a hit on a block in primary cache 34, this bit is updated to select the other block in this set. That is, this block has been used more recently than the other block. When there is a miss, and a new block is refilled into the cache, this bit is updated to select the other block.

There is a separate write enable for each tag array (i.e., 38 and 42) and LRU bit 908. Most tag check operations result in a hit and therefore tag bits 909 and 911 are rarely written. However, LRU bit 908 is written each time a tag is read. Accordingly, the LRU bit is fabricated using a special dual-port RAM cell. The first port enables the reading of LRU bit 908 during phase 1 (i.e., ø1) of any processor tag-check clock cycle. The second port is used to update the LRU bit during phase 2 (i.e., ø2) of such cycle, if there was a cache hit. Additional information regarding the LRU bit is provided in copending U.S. patent application Ser. No. 08/324,124 which, as noted above, is incorporated herein by reference in its entirety for all purposes.

An alternative method to LRU is the well-known pseudo random replacement method. In this method, the decision as to which way is replaced is chosen randomly; no access patterns are considered. This may be implemented using a counter that is incremented every clock cycle. The lower bits of the counter may be used to select the way to be refilled.

IV. Secondary Cache Control

Figure 12:
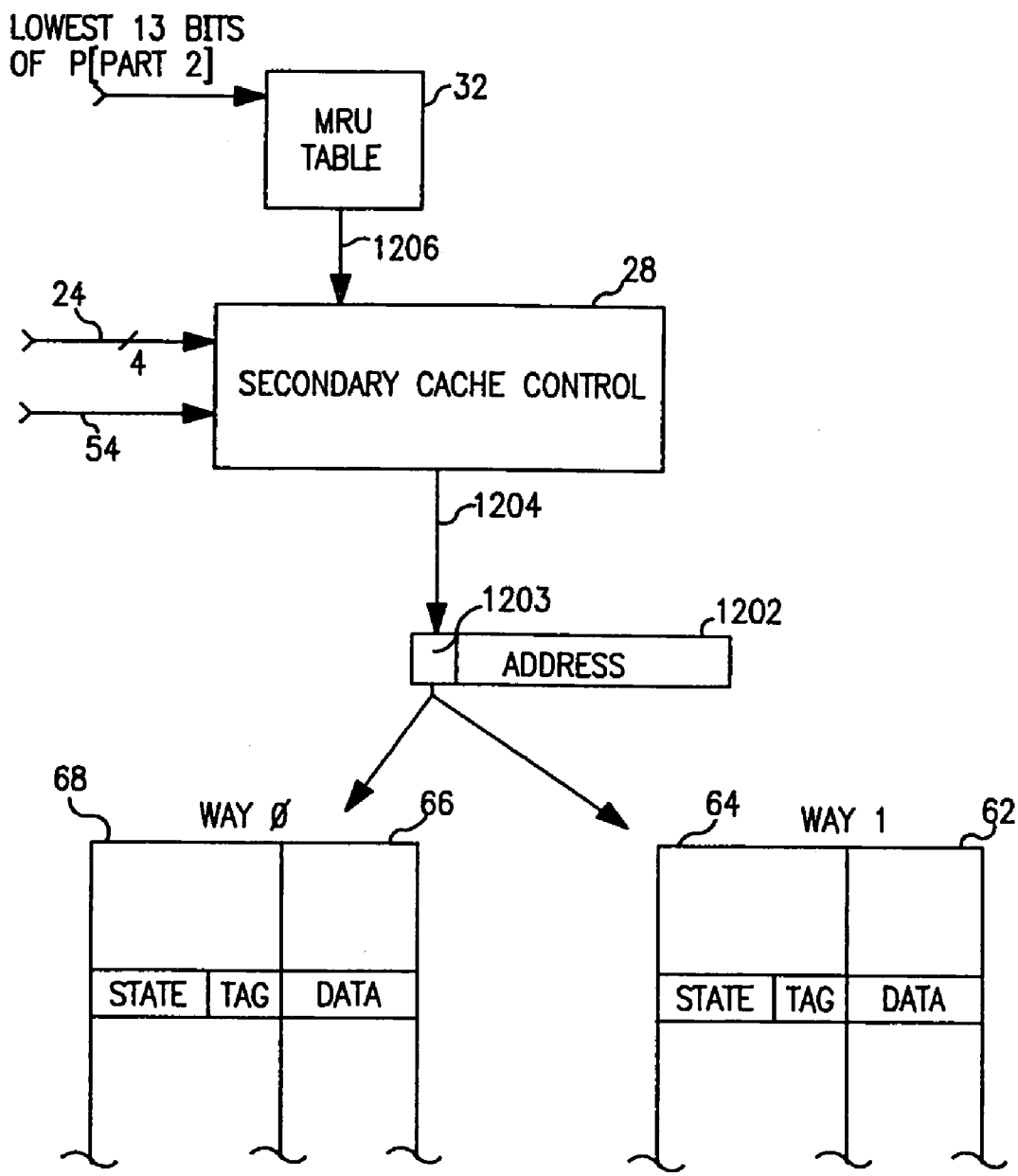
FIGS. 12 and 13 illustrate components and operation of the secondary cache control unit of FIG. 1.
Figure 13:
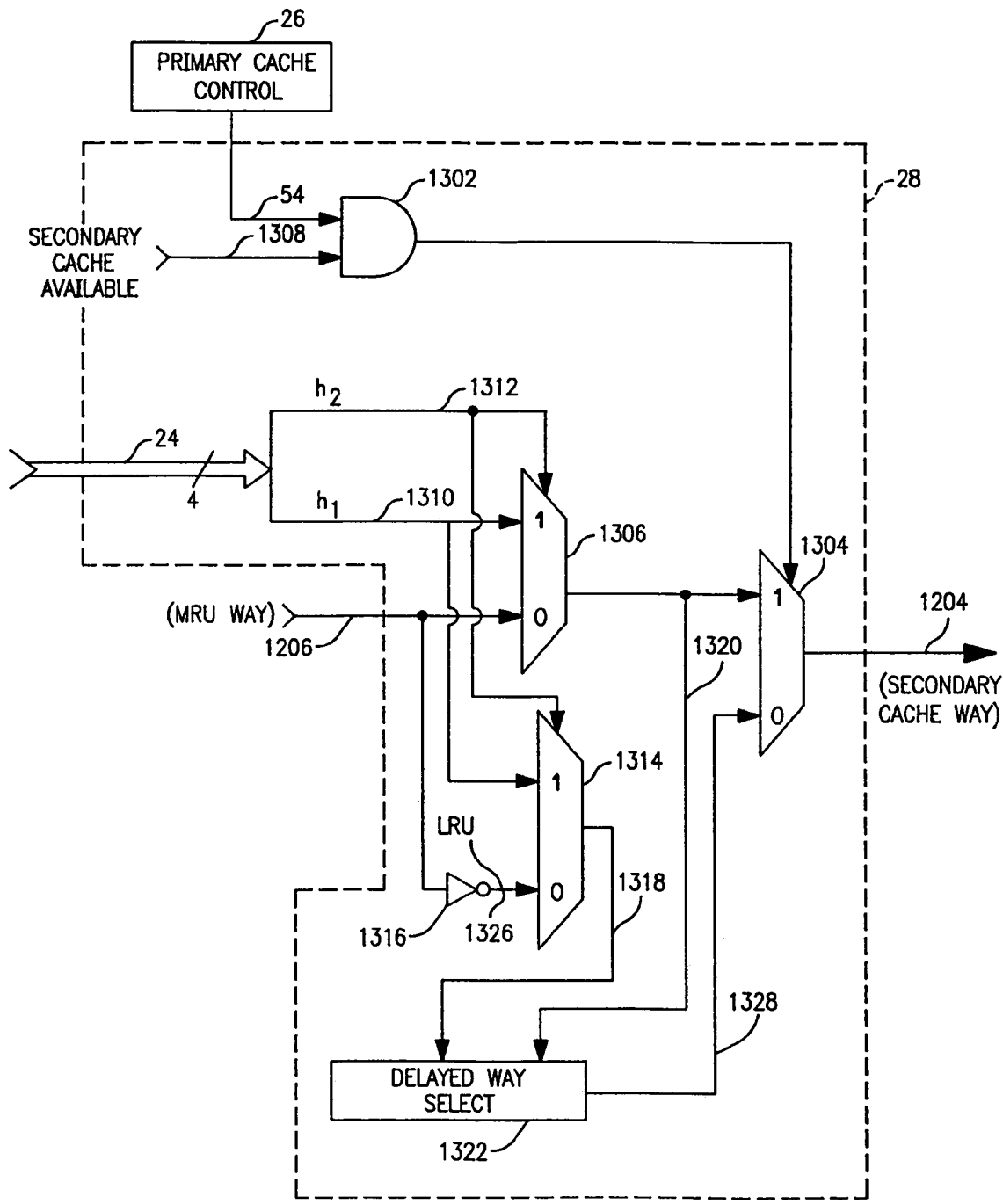

FIGS. 12 and 13 illustrate components and operations of secondary cache control 28 which facilitate way selection (using prefetching hint bits) for a secondary cache refill operation. Referring to FIG. 12, control 28 receives bits h2, h1, h0 and "access request" from line 24, hit/miss indication from primary miss line 54, and a "most recently used" (MRU) bit from MRU Table 32 on line 1206. The lowest 13 bits of the physical address P[part2] generated by TLB 1020 (FIG. 2) is used to index MRU Table 32.

Control 28 processes selective information to generate a "most significant bit" (MSB) 1203 of address 1202, which is used to access the secondary cache. The logical state of MSB 1203 (i.e., logic 0 or 1) indicates the cache way to be addressed (i.e., way 0 or way 1) for refilling (and reading) operations.

Referring to FIG. 13, bit h2 from line 24 is applied to the select input of MUXs 1306 and 1314. MUX 1306 selects between bit hi on line 1310 and the MRU bit on line 1206. The output of MUX 1306 selects a cache way for prefetching data from (i.e., reading) secondary cache 70. Conversely, MUX 1314 selects between bit h1 on line 1310 and a complemented MRU bit (i.e., an LRU bit) on line 1326. The output of MUX 1314 selects a cache way for prefetching data into (i.e., refilling) secondary cache 70. As shown in FIG. 13, line 1206 (MRU Way) is coupled to inverter 1316 which is, in turn, coupled to MUX 1314 through line 1326. The output of inverter 1316 is an LRU bit.

Referring to MUXs 1306 and 1314, if h2 is high, prefetching hints are active (see Tables 1 and 2) and bit h1 is selected in each MUX. Alternatively, if h2 is low, prefetching hint bits are inactive. Accordingly, way selection is determined through an MRU bit held in MRU Table 32.

As mentioned above, the way-select values output by MUX 1306 (i.e., h1 or MRU) are used for prefetching data from secondary cache 70. When the secondary cache is available, line 1308 will be high. Accordingly, when a primary cache miss signal is received on line 54, a high signal is applied to the select input of MUX 1304 allowing the output of MUX 1306 to pass through to line 1204. The value on line 1204 is concatenated to address 1202 at the MSB location. This MSB (i.e., MSB 1203) selects way 1 or way 0 for address 1202 of the current operation (i.e., reading).

The value on line 1204 remains active for one processor clock cycle. At the end of the cycle, if the secondary cache remains busy, line 1308 drops to a low forcing the output of AND gate 1302 low. Accordingly, the select input to MUX 1304 chooses the 0 input (line 1328). It is from this input that line 1204 will receive all subsequent values so long as secondary cache 70 remains busy.

The output of MUX 1306 is also forwarded to "Delayed Way Select" 1322 via line 1320. Delayed way select is a storage circuit with control logic (i.e., including RAM or register circuits) for temporarily holding, among other things, MRU, LRU and hint bits output from MUXs 1306 and 1314. Once a secondary cache is accessed, all way select values output to line 1204 during subsequent processor clock cycles are output from delayed way select 1322 until the values in select 1322 are exhausted (at which time the secondary cache will no longer be busy and 1308 will go high).

During a secondary cache read, the first way accessed is the way identified by the h1 or MRU bit output from MUX 1306, as discussed above. The second way is accessed in a subsequent cycle.

When secondary cache 70 becomes busy (i.e., facilitating a read or waiting for data from main memory to perform a refill), line 1308 goes low during a cycle transition from a first cycle (i.e., initial access to available cache) to a second cycle (i.e., subsequent access to cache). Accordingly the output of AND gate 1302 is also pulled low (i.e., logic 0). As such, the 0 input to MUX 1304 (i.e., line 1328) becomes selected. While cache 70 remains in a busy state, all new way select values from MUX 1306 are forwarded exclusively to delayed way select 1322 for access to cache 70 through input 0 of MUX 1304.

While MUX 1306 carries out its way selection for reading operations, MUX 1314 concurrently chooses way-select values h1 (line 1310) or LRU (line 1326) based on the same h2 bit (line 1312) for refilling operations. As shown in FIG. 13, this value is forwarded to delayed way select 1322 on line 1318 for temporary storage. Should a corresponding read operation result in a secondary cache 70 miss (after both ways are accessed), line 1308 remains low while system interface control 30 is accessed to retrieve refilling data from main memory 80. In the meantime, the value selected by MUX 1314 is output from select 1322 and forwarded to line 1204 through the 0 input of MUX 1304.

As described above for a secondary-cache read, the value output on line 1204 is concatenated to address 1202 at the MSB location. This MSB (i.e., MSB 1203) selects way 1 or way 0 for address 1202. Accordingly, data retrieved from main memory 80 for refilling operations will be directed to the appropriate way using MSB 1203 (which is the same hi value or the inverse of the MRU value used for reading). Concurrently, primary cache control 26 is used to perform refill operations for primary cache 34 using the same data accessed from main memory 80.

In this embodiment, delayed way select 1322 serves as a temporary buffer allowing way values for secondary-cache reads and subsequent refills to sequentially track these operations as cache 70 becomes available. When a read attempt results in a miss, the corresponding refill way value (i.e., prefetching hint bit hi or an LRU bit) is accessed from delayed way select 1322 and forwarded to line 1204 through MUX 1304. In this regard, delayed way select 1322 functions like a first-in-first-out buffer (i.e., data is transferred asynchronously; piling up as it comes in and releasing it in the same order when cache 70 becomes available).

As the foregoing illustrates, in a system having at least a two-way set-associative primary cache, a user may specify hints that control which way prefetched data is placed. The two hints described above may be referred to as "prefetch retained" and "prefetched streamed". These hints correspond to particular ways in a set-associative cache. For example, in a two-way set-associative cache, prefetched retained might correspond to always placing prefetched data in way 1. Prefetched streamed, on the other hand, might correspond to placing such data in way 0. Normal prefetches (i.e., without either of these hints) and normal loads and stores rely on the normal replacement algorithm (e.g., LRU) to decide where data should be placed.

As an example of how this works, consider a blocked matrix multiply algorithm. The "blocked" portion of the data will be prefetched into the cache using the prefetch retained hint, and more importantly, the nonblocked data will be prefetched using the prefetched streamed hint. Therefore, the blocked data are less likely to be replaced from the cache and the latency will be essentially hidden.

A related example is the multiplication of a matrix by a vector. In this case, each element of the vector will be visited many times to carry out the multiplication while each element of the matrix will be visited but once. Accordingly, in this case, the vector will be prefetched into the cache using the prefetch retained hint, and the matrix will be prefetched using the prefetched streamed hint.

Similarly, in a DSP algorithm the filter coefficients would be prefetched using prefetched retained, and signal data would be prefetched using prefetched streamed. Further, operating system operations such as bcopy and bzero would only use prefetched hints.

One advantage of prefetched hints is that it involves no cache state whatsoever. A hint is only kept in an instruction queue (or, perhaps, in the cache controller) while the prefetch is outstanding, and once the prefetched data is placed in the cache, the hint may be discarded. Another advantage of prefetch hints is that such hints only affect cases where the programmer, compiler or operating system has a strong reason to believe that data should go into a particular subset (i.e., way) of the cache. In all other cases, the full cache will be used in the normal way.

In contrast, if a programmer provided "way hints" for all loads and stores, it is likely that processor performance could actually get worse. However, prefetching hints in accordance with the principals of the invention may be selectively used based upon, for example, the access patterns for certain types of data.

As another example, consider what happens on a context switch. Since this is a stateless operation, the context switch itself occurs as normal. When a context is restarted, all of its data may have been flushed from the cache, but the processor will not realize this. Therefore, the processor will continue using "prefetched streamed" instructions to prefetch the streamed data, but the "retained" data will not be prefetched again. However, once the "retained" data manages to be fetched back into the appropriate cache way through the normal replacement mechanism (i.e., "LRU" in this case), it will stay there. Therefore, after an initial dip in performance resulting from a context switch, the performance should quickly climb back up to optimal level.

The mapping of the "retained" and "streamed" hints to particular ways in an associative cache should be consistent across all applications. For example, if blocked matrix multiply was fetching "blocked" data into way 0, and "non-blocked" data into way 1, the operating system should not suddenly run a bcopy operation that clears everything in way 0 (instead, it should clear out way 1). Therefore, rather than identifying a prefetch operation with a particular way, it is better to identify prefetching based upon data types (i.e., retained and streamed) and to-permanently bind this name to particular ways.

In multiple-way set-associative caches (such as a 4-way set-associative cache) it would be desirable to put streamed data in a smaller number of ways than retained data. For example, in a 4-way set-associative cache only one of the four ways should hold streamed data while the remaining three of the four ways should hold retained data.

While the above is a complete description of the preferred embodiment of the invention, various modifications, alternatives and equivalents may be used. Therefore, the above description should not be taken as limiting the scope of the invention which is defined by the appended claims.

What is claimed is:

1. A method comprising:
    issuing an instruction, wherein said instruction includes a hint field, a base field and an offset field;
    forming an address to access data in a cache, wherein said address is formed by using information contained in said offset and base fields; and
    prefetching said data, when unavailable in said cache, in accordance with hint information contained in said hint field, wherein said hint information indicates an expected use of said data and a destination for said data, and said hint information is independent of said address.

2. The method of claim 1 wherein said address is a virtual address.

3. The method of claim 1 wherein said hint information indicates said data is expected to be not reused extensively and directs said data to a certain way destination in said cache.

4. The method of claim 1 wherein said hint information indicates said data is expected to be reused extensively and directs said data to a certain way destination in said cache.

5. The method of claim 1 wherein said hint information directs said data to (a) a first way destination when said data is expected to be not reused extensively, and (b) a second way destination when said data is expected to be reused extensively.

6. The method of claim 1 wherein said hint information directs said data to (a) a first way destination when said data is expected to be loaded but not reused extensively or said data is expected to be stored or modified but not reused extensively, and (b) a second way destination when said data is expected to be loaded and reused extensively or said data is expected to be stored or modified and reused extensively.

7. A method comprising:
    issuing an instruction, wherein said instruction includes a hint field, a base field and an index field;
    forming an address to access data in a cache, wherein said address is formed by using information contained in said index and base fields; and
    prefetching said data, when unavailable in said cache, in accordance with hint information contained in said hint field, wherein said hint information indicates an expected use of said data and a destination for said data, and said hint information is independent of said address.

8. The method of claim 7 wherein said address is a virtual address.

9. The method of claim 7 wherein said hint information indicates said data is expected to be not reused extensively and directs said data to a certain way destination in said cache.

10. The method of claim 7 wherein said hint information indicates said data is expected to be reused extensively and directs said data to a certain way destination in said cache.

11. The method of claim 7 wherein said hint information directs said data to (a) a first way destination when said data is expected to be not reused extensively, and (b) a second way destination when said data is expected to be reused extensively.

12. The method of claim 7 wherein said hint information directs said data to (a) a first way destination when said data is expected to be loaded but not reused extensively or said data is expected to be stored or modified but not reused extensively, and (b) a second way destination when data is expected to be loaded and reused extensively or said data is expected to be stored or modified and reused extensively.

* * * * *